United States Patent
Klein et al.

[19]

[11] Patent Number: 6,085,328
[45] Date of Patent: *Jul. 4, 2000

[54] WAKE UP OF A SLEEPING COMPUTER USING I/O SNOOPING AND IMPERFECT PACKET FILTERING

[75] Inventors: Philippe Klein, Jerusalem; Simoni Ben-Michael, Givat Zeev, both of Israel

[73] Assignee: Compaq Computer Corporation, Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 09/009,788

[22] Filed: Jan. 20, 1998

[51] Int. Cl.[7] ............................................ G06F 1/30
[52] U.S. Cl. ............................................. 713/310; 709/227
[58] Field of Search ................................. 713/300–340; 709/227

[56] References Cited

U.S. PATENT DOCUMENTS

| | | | |
|---|---|---|---|
| 5,012,233 | 4/1991 | Poulsen, Jr. .......................... | 340/825.18 |
| 5,381,414 | 1/1995 | Gibson .................................. | 370/94.2 |
| 5,396,636 | 3/1995 | Gallagher et al. ..................... | 395/750 |
| 5,473,607 | 12/1995 | Hausman et al. .................... | 370/85.13 |
| 5,742,833 | 4/1998 | Dea et al. ............................ | 395/750.05 |
| 5,802,305 | 9/1998 | McKaughan et al. ............... | 395/200.57 |
| 5,809,313 | 9/1998 | Gianni .................................. | 395/750.02 |
| 5,842,224 | 11/1998 | Fenner .................................. | 711/202 |
| 5,848,233 | 12/1998 | Radia et al. .......................... | 395/187.01 |
| 5,884,025 | 3/1999 | Baehr et al. ......................... | 395/187.01 |
| 5,887,131 | 3/1999 | Angelo ................................. | 395/188.01 |
| 5,915,119 | 6/1999 | Cone .................................... | 713/310 |

OTHER PUBLICATIONS

Danbury and Goff, Small Area Networks using Serial Data Transfer—12C Bus with Multiple Masters, Electronic Engineering, Apr. 1994, pp. 85—95.

I2C Bus and How To Use It, Philip Semiconductor, Apr. 1995, pp. 1–24.

PCF 84C00, 8–Bit Microcontrolled with 12C interface, Philip Semiconductors Integrated Circuits, Nov. 1996, pp. 2–23.

ISO/IEC 8802–3: 1996 (E), ANSI/IEEE Std 802.3, p. 2.

Philip Semiconductors Web Pages, 1997.

*Primary Examiner*—Ayaz R. Sheikh
*Assistant Examiner*—Jigar Pancholi
*Attorney, Agent, or Firm*—Cesari and McKenna, LLP

[57] ABSTRACT

A reliable and simple means to awaken sleeping computers is to maintain the network interface subsystem at full power, and to filter detected packets so that when desired packets are detected, full power is restored to the entire computer. An interface to connect a computer to a network is provided, where, the computer has a high power state and a low power state, and the computer is capable of normal operation when in the high power state, and the computer is substantially inactivated when in the low power state. A packet is received from the network. The packet is filtered by computing a hash function using at least one byte selected from the packet. A transition is initiated, responsive to a result of filtering the packet, to transition the computer from the low power state to the high power state. A mask may be used to select the at least one byte. Several bytes may be selected by the mask. A first register may be used to hold the mask. A second register may be used to hold a desired result of the hash function calculation. A result of the hash function calculation is compared with a contents of the second register to determine whether or not the result of the hash function calculation matches the contents of the second register. A perfect filtering or a second hash function filtering may be combined by AND or NOT logical operations, in making the decision whether or not to awaken the computer.

26 Claims, 15 Drawing Sheets

48 BIT ADDRESS FORMAT

16 BIT ADDRESS FORMAT

I/G = 0    INDIVIDUAL ADDRESS
I/G = 1    GROUP ADDRESS
U/L = 0    GLOBALLY ADMINISTERED ADDRESS
U/L = 1    LOCALLY ADMINISTERED ADDRESS

FIG. 8

UNICAST IP

| OFFSET (BYTES) | | PATTERN (HEX) | |
|---|---|---|---|
| ETHERNET | 802.3 | | |
| 00 | 00 | XX XX XX XX XX XX | DESTINATION MAC ADDRESS (STATION ADDRESS) |
| 12 | 20 | 08 00 | PROTOCOL TYPE (IP) |

FIG. 9

ARP REQUEST (IPV4 ONLY)

| OFFSET (BYTES) | | PATTERN (HEX) | |
|---|---|---|---|
| ETHERNET | 802.3 | | |
| 00 | 00 | FF FF FF FF FF FF | DESTINATION MAC ADDRESS (BROADCAST) |
| 12 | 20 | 08 06 | PROTOCOL TYPE (ARP) |
| 21 | 29 | 01 | ARP OPCODE (REQUEST) |
| 38 | 46 | XX XX XX XX | IP ADDRESS REQUESTED |

NBT NAME QUERY/REGISTRATION FOR COMPUTERNAME (IPV4 ONLY)

| OFFSET (BYTES) | | PATTERN (HEX) | |
|---|---|---|---|
| ETHERNET | 802.3 | | |
| 00 | 00 | FF FF FF FF FF FF | DESTINATION MAC ADDRESS (BROADCAST) |
| 12 | 20 | 08 00 | PROTOCOL TYPE (IP) |
| 23 | 31 | 11 | PROTOCOL (UDP) |
| 34 | 42 | 00 89 00 89 | PORT NUMBER (NETBIOS NAME SERVICE) |
| 45 | 53 | 10 | NETBIOS FLAGS (QUERY OR REGISTRATION) |
| 54 | 62 | 20 | NULL SCOPE BYTE LEADING THE COMPUTERNAME FIELD |
| 55 | 63 | XX XX XX XX XX XX XX XX<br>XX XX XX XX XX XX XX XX<br>XX XX XX XX XX XX XX XX<br>XX XX XX XX XX XX XX XX | COMPUTERNAME: 32_BYTES FIELD CODING IN HALF-ASCII THE NAME OF THE COMPUTER |

NEIGHBOR SOLICITATION (IPv6 ONLY)

| | OFFSET (BYTES) | | PATTERN (HEX) | |
|---|---|---|---|---|
| ETHERNET | 802.3 | | | |
| 1102 | 00 | | FF FF FF FF FF FF | DESTINATION MAC ADDRESS (BROADCAST) |
| 1104 | 12 | | 08 00 | PROTOCOL TYPE (IP) |
| 1106 | 38 | | XX XX XX XX XX XX XX XX XX XX XX XX XX XX XX XX | IP DESTINATION ADDRESS (TARGET'S SOLICITED NODE MULTICAST ADDRESS) |

FIG. 11

UNICAST IPX

| | FRAME TYPE | OFFSET (BYTES) | PATTERN (HEX) | |
|---|---|---|---|---|
| 1202 | ALL | 00 | XX XX XX XX XX XX | DESTINATION MAC ADDRESS (STATION ADDRESS) |
| 1204 | ETH_II | 12 | 81 37 | PROTOCOL TYPE (IPX) |
| 1206 | ETH_SNAP | 14 | AA AA 03 00 00 00 81 37 | SAP + PROTOCOL TYPE (IPX) |
| 1208 | ETH_802.3 | 14 | FF FF | PROTOCOL TYPE (IPX) |
| 1210 | ETH_802.2 | 14 | E0 E0 03 | SAP + CONTROL (IPX) |

FIG. 12

IPX DIAGNOSTIC RESPONDER REQUEST

| | FRAME TYPE | OFFSET (BYTES) | PATTERN (HEX) | |
|---|---|---|---|---|
| 1301 | ALL | 00 | FF FF FF FF FF FF | DESTINATION MAC ADDRESS (BROADCAST) |
| 1302 | ETH_II | 12 | 81 37 | PROTOCOL TYPE (IPX) |
| | | 30 | 04 56 | IPX DESTINATION SOCKET (DIAGNOSTIC REQUEST) |
| 1304 | ETH_SNAP | 14 | AA AA 03 00 00 00 81 37 | SAP + PROTOCOL TYPE (IPX) |
| | | 38 | 04 56 | IPX DESTINATION SOCKET (DIAGNOSTIC REQUEST) |
| 1306 | ETH_802.3 | 14 | FF FF | PROTOCOL TYPE (IPX) |
| | | 30 | 04 56 | IPX DESTINATION SOCKET (DIAGNOSTIC REQUEST) |
| 1308 | ETH_802.2 | 14 | E0 E0 03 | SAP + CONTROL (IPX) |
| | | 33 | 04 56 | IPX DESTINATION SOCKET (DIAGNOSTIC REQUEST) |

FIG. 13

4.4.2 PATTERN'S COMMAND

| BIT | DEFAULT VALUE | ACCESS | | |
|-----|---------------|--------|--|--|
| 07:04 | 0 H | R/W | RESERVED | |
| 03 | 0 H | R/W | AND_PREVIOUS | WHEN SET, ANDS THE CURRENT ENTRY MATCHING SIGNAL WITH THE MATCHING SIGNAL OF THE PREVIOUS FILTER'S ENTRY.<br><br>THIS ALLOWS TO FILTER A PATTERN LONGER THAN THE ENTRY'S BYTE MASK (32 BYTES) BY SPLITTING IT ALONG MULTIPLE FILTER'S ENTRIES.<br><br>FOR FILTER #1, AND_PREVIOUS CHAINS THE FILTER'S MATCHING SIGNAL WITH THE RESULT OF THE GLOBAL_UNICAST FILTER. |
| 02 | 0 H | R/W | ADDRESS_TYPE | INDICATES THE DESTINATION ADDRESS TYPE (UNICAST OR BROADCAST) OF THE PATTERN.<br>0: BROADCAST<br>1: UNICAST<br><br>THE PATTERN DESTINATION ADDRESS I NOT FILTERED BY THE PATTERN FILTER BUT BY THE ADAPTER'S CAM. A MISMATCH BETWEEN THE ADDRESS_TYPE SIGNAL PROVIDED BY THE CAM INVALIDATES THE PATTERN CRC MATCHING. |

FIG. 15A 4.4.2 PATTERN'S COMMAND (CONT'D.)

| BIT | DEFAULT VALUE | ACCESS | | |
|-----|---------------|--------|--|--|
| 01 | 0 H | R/W | INVERSE MODE | WHEN SET, INVERSE THE LOGIC OF THE CRC MATCHING SIGNAL TO MAKE THE PATTERN A REJECTION PATTERN.<br><br>TOGETHER WITH THE AND_PREVIOUS MODE, ALLOWS TO REJECT A SUBSET OF WAKE UP PACKETS (BY CREATING FILTER LIKE "PATTERN 1 AND NOT PATTERN 2"). |
| 00 | 0 H | R/W | ENABLE FILTER | WHEN SET, ENABLE PATTERN FILTERING. |

FIG. 15B 4.4.1 PATTERN'S BYTE MASK

| BIT | DEFAULT VALUE | ACCESS | |
|---|---|---|---|
| 31:00 | 0 H | R/W | PATTERN'S BYTE MASK | IF BIT NUMBER I OF THE BYTE MASK IS 1, THEN BYTE NUMBER (I + OFFSET) OF THE INCOMING FRAMES WILL BE STROBE BY THE PATTERN'S CRC MACHINE. OTHERWISE BYTE I IS IGNORED. |

FIG. 16

4.4.3 PATTERN'S OFFSET

| BIT | DEFAULT VALUE | ACCESS | | |
|---|---|---|---|---|
| 07:00 | 00 H | R/W | PATTERN'S OFFSET | THE OFFSET OF THE FIRST BYTE OF THE PATTERN FIELD WITHIN THE FRAME (OFFSET 0 IS THE FIRST BYTE OF THE FRAME'S DESTINATION ADDRESS). |

FIG. 17

4.4.4 PATTERN'S CRC

| BIT | DEFAULT VALUE | ACCESS | | |
|---|---|---|---|---|
| 15:00 | 0000 H | R/W | PATTERN'S CRC | THE 16_BIT CRC MATCHING VALUE CALCULATED FROM THE PATTERN AND BYTE_MASK GIVEN BY THE TRANSPORT. |

FIG. 18

WAKE UP OF A SLEEPING COMPUTER USING I/O SNOOPING AND IMPERFECT PACKET FILTERING

FIELD OF THE INVENTION

This invention relates to use of a computer having a low power or "sleeping state" and the computer connected to a network, and more particularly to waking the computer upon receipt of a packet from the network.

BACKGROUND

For energy saving reasons, it is often convenient, when a computer is not in use, that it is either: powered down; or placed in a very low power consumption state. For some applications, entirely powering down a computer is not acceptable. For example, a computer connected to a network cannot be managed from a remote site if the computer is entirely powered down.

One alternative is to have a subsystem of the computer maintained at full power for the reception of packets from the network, so that a special computer on the network may issue a special "wake-up" packet, the reception of which causes the computer to become powered up. However, a disadvantage of the use of a special computer transmitting a special "wake-up" packet is that the special computer may have a list of many computers on the network which it must awaken. Maintaining such a list, updating the list, and awakening computers on the network is a clumsy and undesirable solution to the dual problem of both remote management of networked computers, and of maintaining the computers in a low power mode, or "asleep", and then awakening the computer.

There is needed a reliable and simple means to awaken a computer which is substantially powered down and which is connected to a network, and not having to maintain a special computer to awaken sleeping computers by transmission of special "wake-up" packets on the network.

SUMMARY OF THE INVENTION

A reliable and simple means to awaken sleeping computers is to maintain the network interface subsystem at full power, and to filter detected packets so that when desired packets are detected, full power is restored to the entire computer. An interface to connect a computer to a network is provided, where, the computer has a high power state and a low power state, and the computer is capable of normal operation when in the high power state, and the computer is substantially inactivated when in the low power state. A packet is received from the network. The packet is filtered by computing a hash function using at least one byte selected from the packet. A transition is initiated, responsive to a result of filtering the packet, to transition the computer from the low power state to the high power state. A mask may be used to select at least one byte. Several bytes may be selected by the mask. A first register may be used to hold the mask. A second register may be used to hold a desired result of the hash function calculation. A result of the hash function calculation is compared with a contents of the second register to determine whether or not the result of the hash function calculation matches the contents of the second register. A perfect filtering or a second hash function filtering may be combined by AND or NOT logical operations in making the decision whether or not to awaken the computer.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views:

FIG. 8 is a packet format diagram for a unicast IP packet.

FIG. 9 is a packet format diagram for an ARP request packet.

FIG. 10 is a packet format diagram for a NBT name/query registration packet.

FIG. 11 is a packet format diagram for a neighbor solicitation packet.

FIG. 12 is a packet format diagram for a unicast IPX packet.

FIG. 13 is a packet format diagram for a IPX diagnostic responder request packet.

FIG. 15 is a chart of a register field for filter commands.

FIG. 16 is a chart of a register field for a byte mask.

FIG. 17 is a chart of a register field for an offset for a filter mask.

FIG. 18 is a chart of a register field for a filter hash function result.

DETAILED DESCRIPTION

Figure 1:
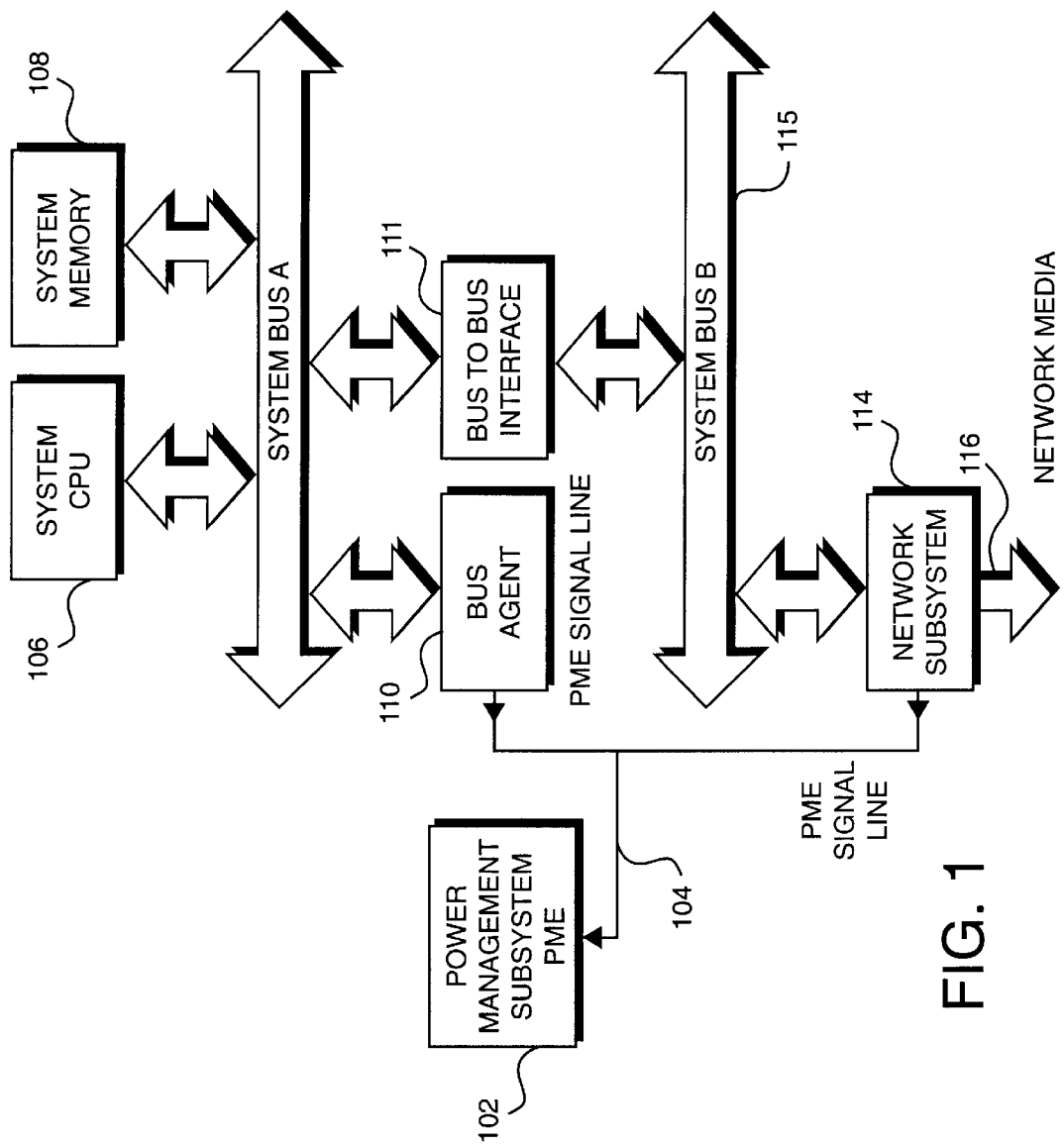
FIG. 1 is a block diagram of hardware of a computer system.

The network subsystem of a computer system of the invention is fully powered up, even when power is withdrawn from other components of the computer system. Only when the network subsystem detects a packet that should be received and acted upon by the system CPU, the network subsystem will initiate restoration of power to the other components of the computer system. That is, the network subsystem signals a power management subsystem, and the power management subsystem restores power to the rest of the computer system. The packets that should be received are selected from the management packets used in the network protocol as those to which the sleeping computer should respond. These selected ordinary protocol packets are referred to as "desired packets". The full computer system is then able to process the incoming desired packet, in the event that the "desired" packet is stored in memory, after the system is back up and running. Alternatively, the packet may wake up the computer but the packet be lost, in which event the system will be up and running and able to receive a retry packet from a retry request.

Having a desired packet initiate a wake-up cycle of the computer system allows the system to be "virtually connected", even when part of the system is powered down or is in a low power consumption state. Being "virtually connected" enables the system to be in a low power state, and at the same time monitor the network and act as if it were up and running. In other words, a networking protocol which requires responses to specific packets that are sent to the computer system will cause power to be restored to the computer system, that is the computer system will be awakened. The networking protocol will then not time out, and will not declare the computer system is a "dead system". Hardware Turning now to FIG. 1, computer system 100 has power management subsystem 102. The power management subsystem 102 is connected by wake signal line 104 to various components of computer 100. For example, components of computer system 100 connected to the power management subsystem 102 through wake signal line 104 include bus agent 110 and network subsystem 114.

In operation, when power management subsystem 102 receives an assertion of the wake signal line 104, then power management subsystem 102 executes a power management cycle. In a first exemplary embodiment of the invention, the power management cycle executed by the power management subsystem 102 is simply a boot cycle. In a boot cycle the power management subsystem simply re-initializes the computer, that is the power management subsystem brings the computer into full operation from whatever state the computer was in before receipt of the assertion of wake signal line 104.

In a second exemplary embodiment of the invention, the power management subsystem 102 determines which component of the computer asserted the wake signal line 104 and performs a power management cycle appropriate to the component which asserted the Wake signal line 104.

In the present invention, the computer is capable of operating in a low power mode. In a low power mode, the supply of power to selected system components is withdrawn, thereby causing the selected components to be inactive. Full power may be maintained to a "wake-up component", and upon the occurrence of an event, the wake-up component signals the power management subsystem 102 on the wake signal line 104, and causes the power management subsystem to execute a system boot. Upon execution of the system boot, all components of the computer are supplied with full power requirements, and the computer functions normally.

In a preferred embodiment of the invention, the network subsystem 114 is maintained at full power, and all other components of the computer such as the system CPU 106, system memory 108, bus agent 110, etc., have power withdrawn by power management subsystem 102. In this state the computer system 100 is said to be "asleep". Upon the detection of a selected type of packet on the network media 116, network subsystem 114 asserts wake signal line 104. Power management subsystem 102 detects assertion of wake signal line 104, and executes a boot cycle for computer 100.

Stated simply, detection of a selected type of packet on network media 116 by network subsystem 114 causes a sleeping computer to be booted, and for the sleeping computer to become fully functional.

In the exemplary embodiment of the invention shown in FIG. 1, computer system 100 has a moderately complex system architecture in that it has two system busses connected by a bus-to-bus interface 111. A simpler computer system could have only one system bus. Even more complex computer systems could have multiple system CPU units, multiple memory units, multiple memory caches, and a more complex bus architecture connecting the components. The computer system 100 is meant to be representative of computer systems having both simpler architectures and more complex architectures, as the important point emphasized in the computer system 100 is that network subsystem 114 detects a selected type of packet on network media 116, and in response to this detection of a packet, causes a sleeping computer system to become a fully booted and functional computer system. In short, the detection of a selected packet by the network subsystem causes a sleeping computer to awake, and become fully functional, no matter what the architecture of the computer is.

Figure 2:
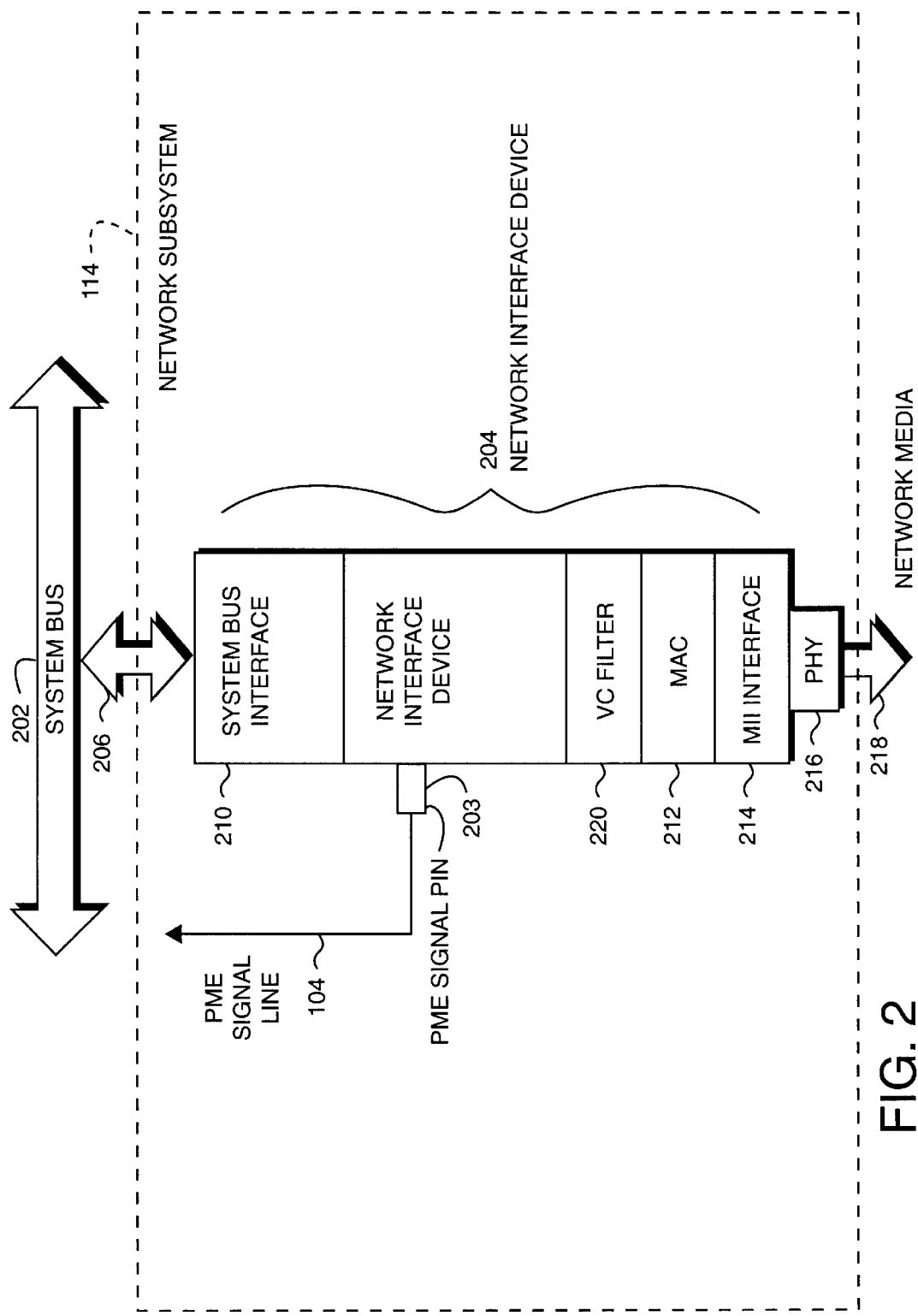
FIG. 2 is a block diagram of a network subsystem.

Turning now to FIG. 2, network subsystem 114 is shown along with system bus 202. Wake signal line 104 connects to wake signal pin 203 of network interface device 204. Also, network interface device 204 connects, along bus path 206, to system bus 202. System bus 202 may be any convenient bus. For example, system bus 202 may be system bus B 115 of FIG. 1. Alternatively, system bus 202 may be a PCI bus, PCI/Card bus, EISA bus, or the older ISA bus, or any other convenient system bus. Also the system bus 202 may be coupled to a USB bus (Universal Serial Bus, a new protocol bus), IEEE 1394 Standard "FireWire" bus, or any other convenient bus for coupling components into a computer system.

For example, the USB, or Universal Serial Bus, is a standard backed by more than 100 companies led by Intel, Microsoft, Compaq, Digital Equipment Corporation, International Business Machine (IBM), Nippon Electric (NEC), etc. The USB bus is designed to solve many of the connection problems which desktop computers have, for example problems such as: too many different connections, printers, mice, joysticks, scanners, modems, speakers, removable drives, bar-code readers, telephones, etc.; and too many cables. The USB is a common designed to provide connection for devices such as these.

For example, the IEEE Standard 1394, which has similarities to the USB bus, but is specified for higher data rates such as 100, 200, and 400 megabits/second.

Network interface device 204 includes a system bus interface 210 for connection to system bus 202. Network interface device 204 also contains Media Access Controller, MAC, device 212. The MAC device 212 connects by Media Independent Interface, MII, 214 to physical device Phy 216. Physical device Phy 216 then connects to the media 218 of a computer network. The MAC device 212, MII interface 214, and physical device Phy 216, for example, may be the standard devices as defined in IEEE standard 802.3, including 802.3u. All disclosures of the IEEE standards 802.3 are incorporated herein by reference.

The network media 218 may be the media of an Ethernet network, and may be twisted pair, coaxial cable, optical fiber, or any other suitable network media. Further, network media 218 may be for any desired computer network, and the computer network may be: alternatively an Ethernet network; alternatively an ATM, or Asynchronous Transfer Mode, network; alternatively, an FDDI, or Fiber Distributed Data Interface, network; and, alternatively, the network may be a telephone line and the media 218 be a local loop telephone connection, a T1 telephone line, an OC3 optical fiber telephone line, or any other convenient computer network media. Although Microsoft currently only supports the Virtual Connection concept for IP and IPX protocols, the invention as described herein may be used for any convenient computer network or protocol.

Network interface device 204 also has virtual connect filter 220, hereinafter VC filter 220. VC filter 220 filters incoming packets after they have been detected by the MAC device 212 in order to determine whether or not computer system 114 should be awakened by network interface device 204 asserting wake signal pin 203, as more fully described hereinafter.

Figure 3:
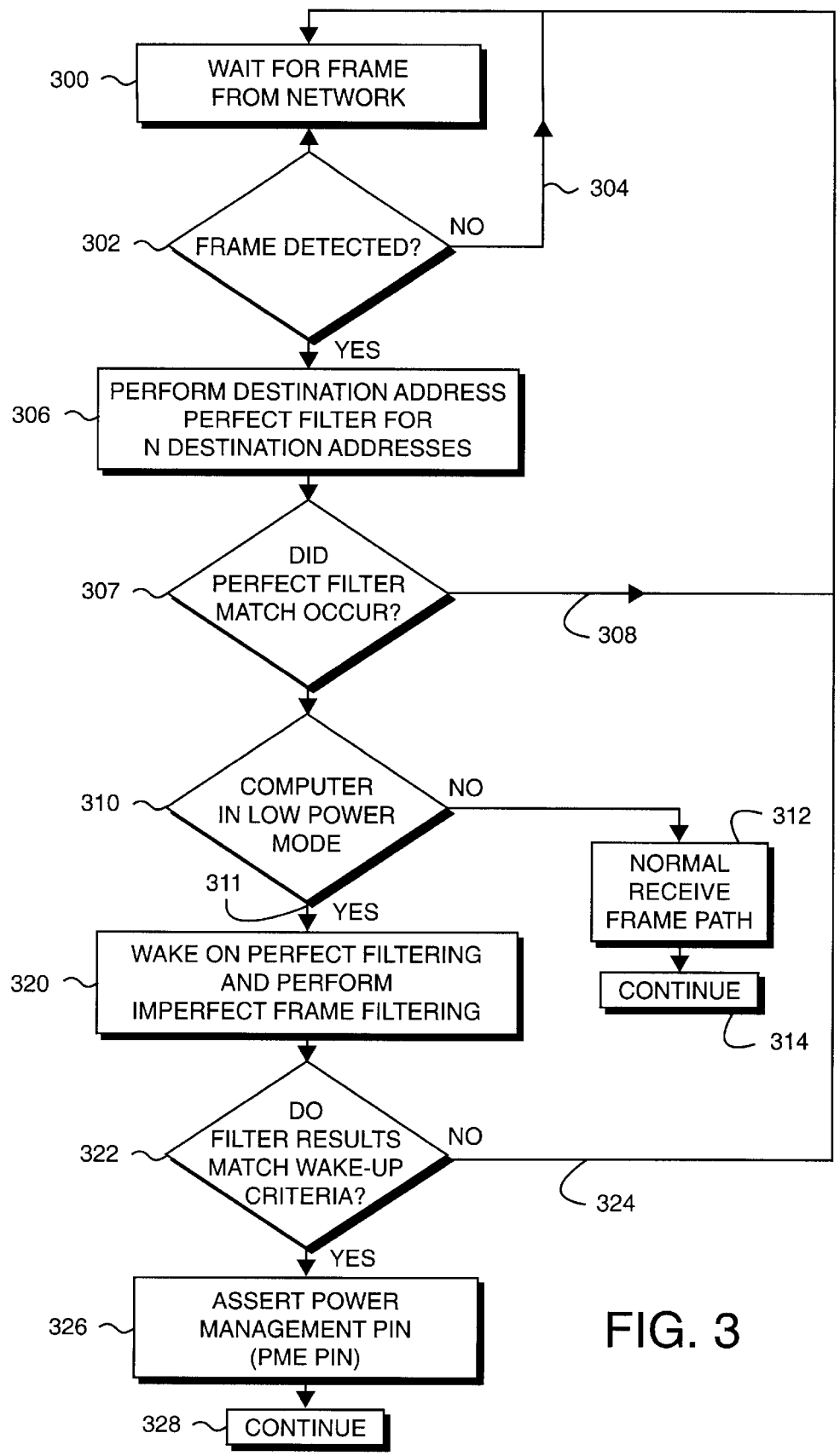
FIG. 3 is a flow chart of a filtering method.

Turning now to FIG. 3, there is shown a flow chart for a process which wakes up a sleeping computer. The process is executed by network interface device 204. At block 300 and decision block 302, along with return path 304, the system waits for detection of a packet from the network.

In the event that a packet is detected at decision block 302, the process goes to block 306. At block 306 a perfect filter operation is performed on the destination addresses of the packet. A number, represented by N, addresses are tested by perfect filtering. In a preferred embodiment of the invention, provision is made for testing up to eight (8) destination addresses by perfect filtering.

For example, two addresses may be tested by perfect filtering: first, the physical address of the computer; and, second a broadcast address, which is 48 "1" bits, or in hex FF FF FF FF FF FF.

At decision block 307, if a perfect filter match occurred, then the process goes to decision block 310. However, if at decision block 307 no perfect filter match occurred, then the process returns along path 308 to block 300 to wait for detection of another packet.

At decision block 310 the power mode of the computer is determined. If the computer is not in low power mode, the process goes to a normal receive frame path at block 312, and then continues at block 314. In the event that the computer is in the low power mode, the process goes along path 311 to block 320.

At block 320 the process computes imperfect filter functions for the packet. In a preferred embodiment of the invention, masks are used in imperfect filtering in order to select bytes from the packet. The selected bytes are then used in a selected number of hash function calculations. The results of the hash function calculations are then compared with desired hash functions, and in the event that the computed hash function matches a desired hash function, the computer is awakened. Upon completion of the imperfect filtering calculations, the process proceeds to decision block 322.

At decision block 322 the results of the computation of the filter functions is compared with the "wake-up criteria". In the event that block 322 determines that the "wake-up criteria" are not met, the process returns along path 324 to wait for detection of another packet at blocks 300 and decision block 302. In the event that block 322 determines that the "wake-up criteria" are met, the process goes to block 326.

At block 326 the process wakes-up the computer. Wake-up of the computer is achieved by the network interface device 204 asserting its wake pin. Assertion of the wake pin asserts wake signal line 104. Power management subsystem 102 detects assertion of wake signal line 104 and restores power to all components of computer system 100, and boots the system into full operation.

Figure 4:
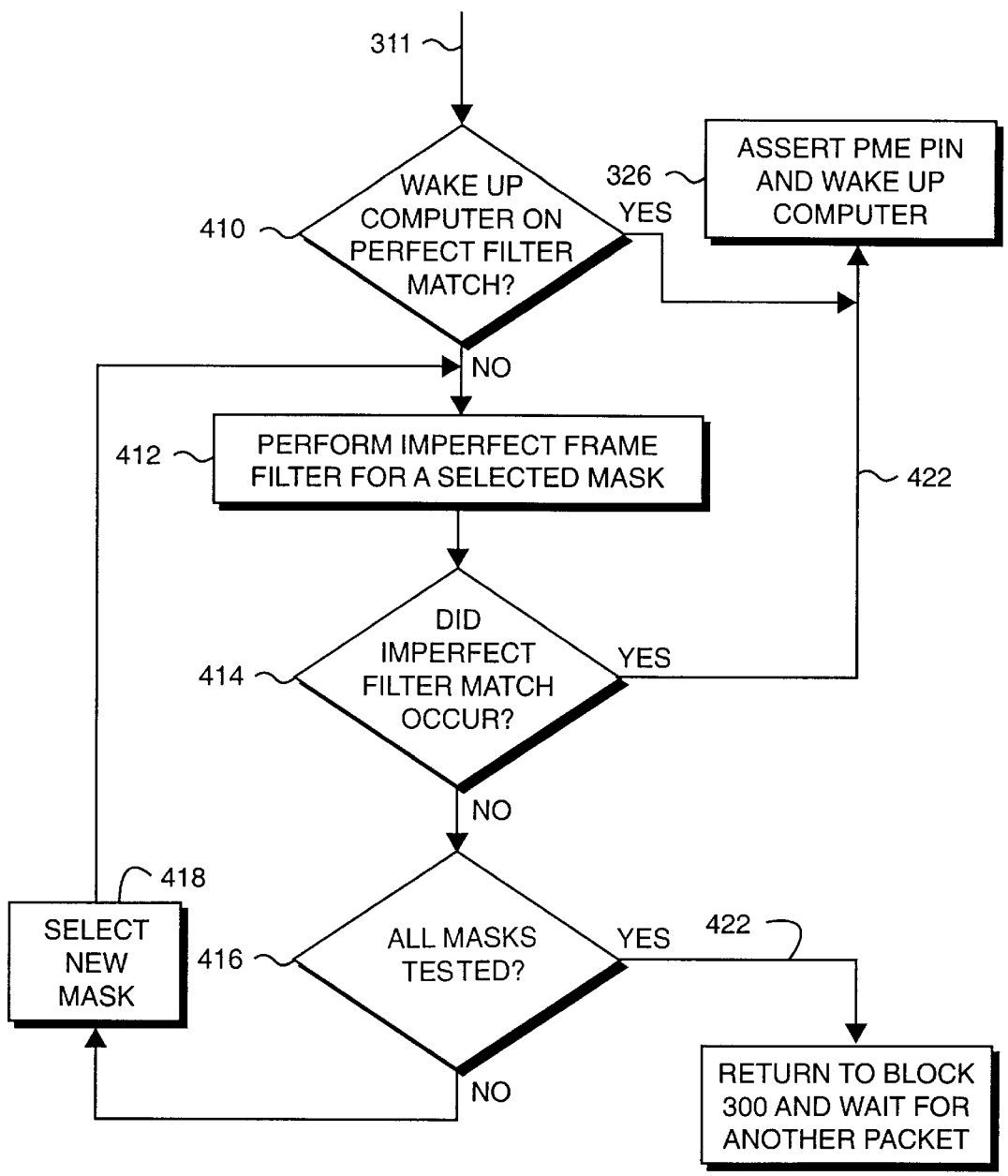
FIG. 4 is a detailed flow chart of a filtering method.

Turning now to FIG. 4, the internal detail of block 320 is shown. Operation passes from path 311 to decision block 410.

Decision block 410 provides the possibility of waking the computer in the event that one of the perfect filter matches occurred. Decision block 410 can be programmed to answer "Yes" in the event that any one of the perfect filtering comparisons of block 402 matched. In the event that decision block 410 answers "Yes", perfect filtering has been selected to wake-up the computer, and then the process goes to block 326 (shown in FIG. 3) where wake pin 203 is asserted in order to wake-up the computer. In the event that decision block 410 answers "No", that perfect filtering alone has not been selected to wake-up the computer, then the process goes to block 412.

At block 412 an imperfect filtering calculation is performed. In a preferred embodiment of the invention, masks are used to select bytes from the packet for a hash function calculation. A mask is selected and a hash function is calculated from that mask. Upon completion of the hash function calculation, the process goes to decision block 414.

At decision block 414 a test of the imperfect filtering calculation of block 412 is performed. In the event that a match occurred in the block 412 calculation, decision block 414 answers "Yes" and the process goes along path 422 to block 326 where the wake pin 203 is asserted and the computer is awakened. In the event that decision block 414 answers "No", that a match did not occur, then the process goes to decision block 416. At decision block 416 a test is performed to determine if all masks have been tested at block 412. In the event that not all masks have been tested, the process goes to block 418.

At block 418 a new mask is selected for the calculation of block 412, and the process goes along path 420 to block 412 where the calculation for the new mask is performed. The process continues around the loop through decision block 416 and block 418 until all masks have been tested. After all masks are tested, decision block 416 answers "No", and the process returns along path 422 to block 300 in order to wait for reception of another packet.

In the event that decision block 414 answers "Yes", that a match did occur in an imperfect packet filter calculation, then the process goes along path 422 to block 326 where the wake pin 203 is asserted and the computer is awakened.

In an exemplary embodiment of the invention, it has been found to be convenient to implement perfect filtering for the two addresses mentioned above. The first address for which perfect filtering has been found to be convenient is the station address, also known as the station "unicast address". The station unicast address is a 48 bit address. The second address for which perfect filtering has been found to be convenient is the broadcast address, which is 48 "1" bits, or in hex, FF FF FF FF FF FF. In an exemplary embodiment of the invention, sixteen registers are implemented for perfect filtering, and so sixteen 48 bit addresses may be used for perfect filtering, for example, 14 other addresses in addition to the station unicast address and the broadcast address.

Imperfect Packet Filter Calculation

The imperfect packet filter calculation is done by a CRC redundancy check machine implemented in silicon. The CRC hardware is used to calculate the hash function used in imperfect filtering. The standard CRC calculation is described next.

Calculation of Frame Check sequence

As set forth in IEEE 802.3-1985 Standard at paragraph 3.2.8, a cyclic redundancy check value is computed as follows. The computed cyclic redundancy check is then stored in the frame check sequence, FCS, field of the IEEE 802.3 standard packet.

A cyclic redundancy check (CRC) is used by the transmit and receive algorithms to generate a CRC value for the FCS field. The frame check sequence (FCS) field contains a 4-octet (32-bit) cyclic redundancy check (CRC) value. This value is computed as a function of the contents of the source/address, destination/address, length, LLC data, and pad (that is, all fields except the preamble, SFD, and FCS). The encoding is defined by the following generating polynomial.

$$G(x) = x^{32} + x^{26} + x^{23} + x^{22} + x^{16} + x^{12} + x^{11} + x^{10} + x^8 + x^7 + x^5 + x^4 + x^2 + x^1$$

Mathematically, the CRC value corresponding to a given packet is defined by the following procedure: (1) The first 32 bits of the packet are complemented. (2) The n bits of the packet are then considered to be the coefficients of a polynomial M(x) of degree n−1. (The first bit of the destination address field corresponds to the x(n−1) term and the last bit of the data field corresponds to the X0 term.) (3) M(x) is multiplied by X32 and divided by G(x), producing a remainder R(x) of degree<31. (4) The coefficients of R(x) are considered to be a 32-bit sequence. (5) The bit sequence is complemented and the result is the CRC. The 32 bits of the CRC value are placed in the frame check sequence field so that the X31 term is the leftmost bit of the first octet, and the X0 term is the rightmost bit of the last octet. (The bits of the CRC are thus transmitted in the order X31, X30, . . . , X1, X0.)

It is to be understood that a CRC calculation is a type of hash function calculation. Generally, in a hash function calculation, a large number of bytes of data are represented by a small number of bits. The hash function generates the small number of bits from the large number of bytes of data. The small number of bits may represent more than one combination of bytes of data, however in the present invention, the lack of unique representation of the large number of bytes is of no concern. If there is an inadvertent match with the CRC calculation, the computer will simply receive a spurious wake-up call, and this occurrence will be a very rare occurrence.

It is to be further understood that the CRC calculation can be done on the basis of a polynomial of order 16. A CRC calculation done with a polynomial of order 32 is referred to as a CRC32 calculation. A CRC calculation done with a polynomial of order 16 is referred to as a CRC16 calculation.

Calculation of Filter Function

The hash function calculation is next described. In a preferred embodiment of the invention, the imperfect packet filter function is performed as a 16 bit CRC calculation, performed as described above in the description of the IEEE standard 802.3 frame check sequence calculation. The 16 bit CRC calculation uses the polynomial, $$G(x)=x^{16}+x^{15}+x^2+1$$

The 16 bit result of the CRC calculation, is the resultant hash function. This 16 bit result is compared with at least one, and in an exemplary embodiment of the invention with several, desired 16 bit values. In the event that the 16 bits resulting from the hash function calculation matches one of a plurality of desired 16 bit values, then a match has occurred, and computer 100 is awakened.

Figure 14:
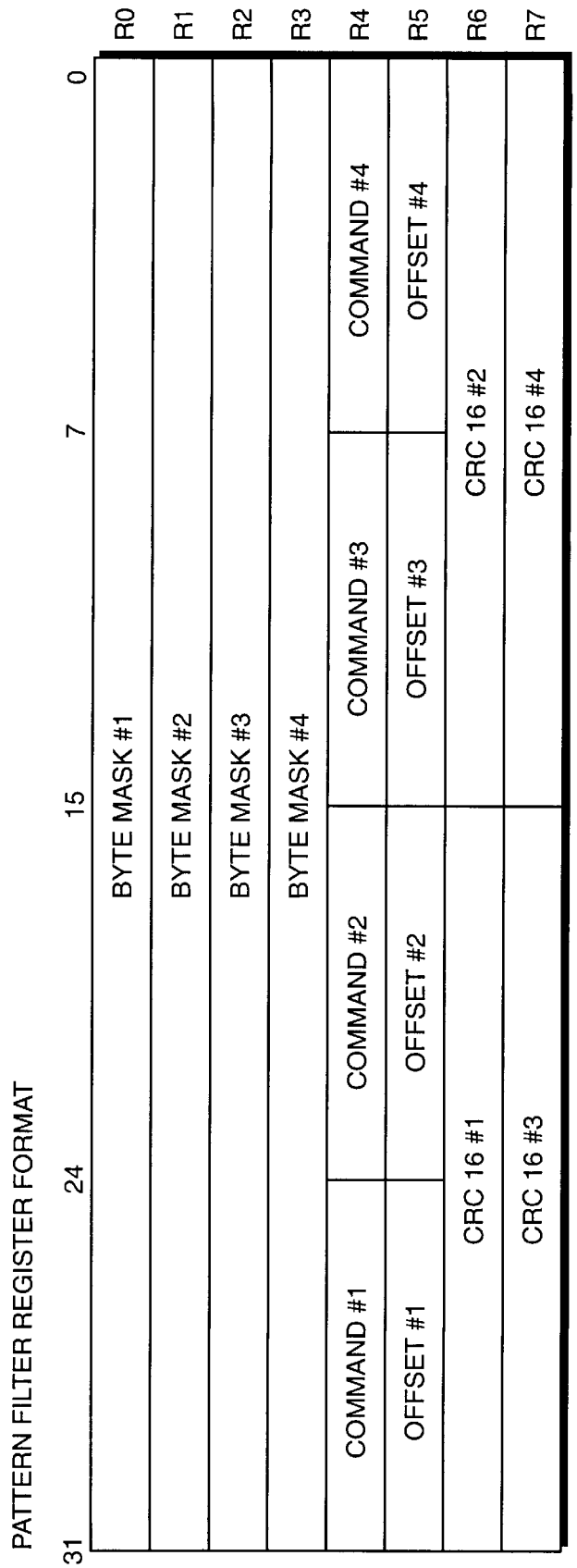
FIG. 14 is a register format diagram.

In a preferred embodiment of the invention, where N imperfect Filters are used, there are N 16 bit CRC machines implemented in the silicon chip so that the N filters may be processed in parallel. This parallel processing minimizes the delay introduced in packet processing by the filtering process. For example, in a system having four imperfect filters implemented in four sets of registers such as are shown in FIG. 14 hereinbelow, four CRC16 machines are implemented in the silicon chip.

Each mask which is used in the hash function calculation is conveniently compared with a desired 16 bit value associated with that mask.

Typical Packet Formats

Figure 5:
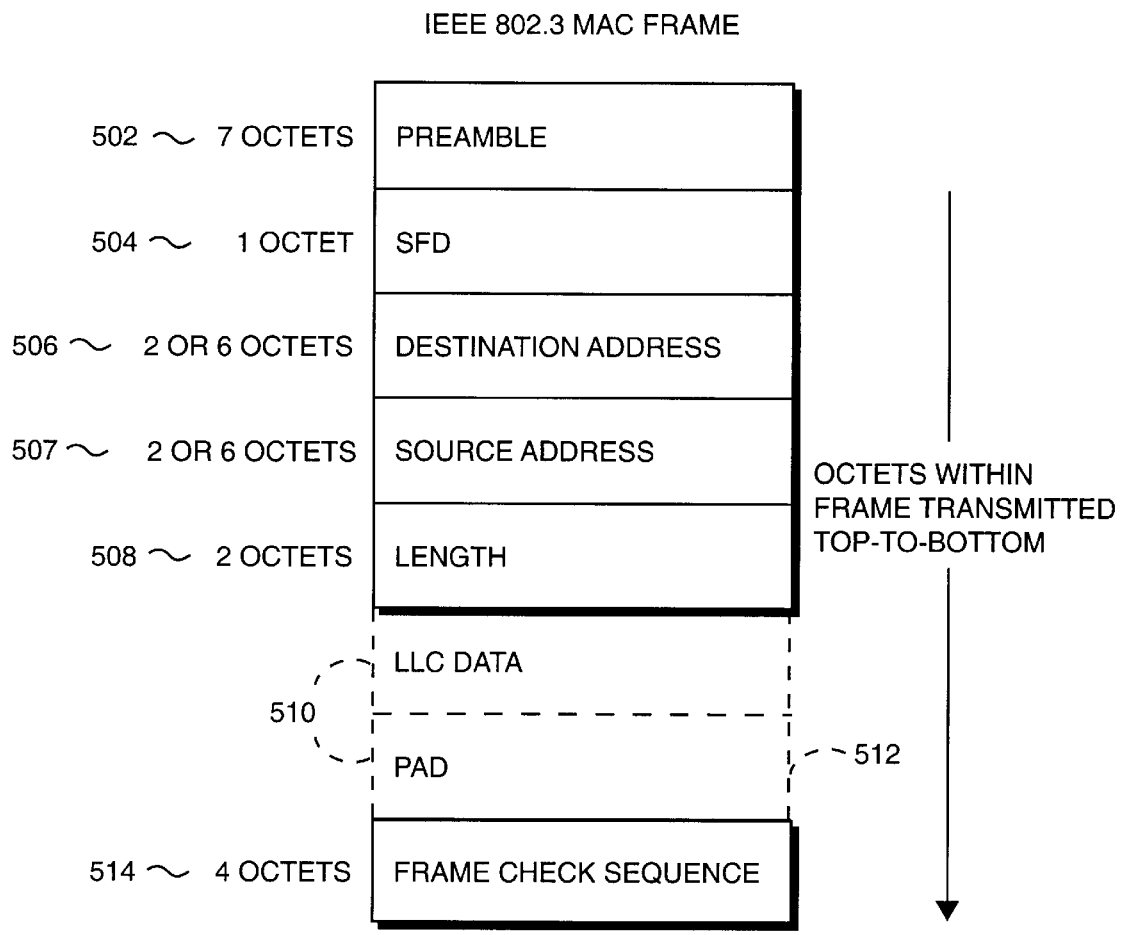
FIG. 5 is a packet format diagram for an IEEE 802.3 MAC frame.

Turning now to FIG. 5, the format of an IEEE 802.3 MAC packet (often referred to as a MAC frame) is shown. Only IEEE 802.3 MAC packets having a 48 bit DA or SA will be discussed, and 16 bit DA and SA frames are not further discussed as a person of ordinary skill in the art can apply the teachings of this invention to addresses of any length.

The IEEE 802.3 MAC packet must be at least 64 bytes in length and not more than 1518 bytes, including the CRC field.

Field 502 is 8 octets (a "byte" and an "octet" are synonyms) of preamble. Field 504 is one octet of SFD, Start of Frame Delimiter. Field 506 is 6 octets (or 48 bits) of Destination Address. Field 507 is 6 octets (or 48 bits) of Source Address. Field 508 is 2 octets of length information. Field 510 is the data. The data field may be between 0 octets and 1500 octets. Field 514 is the frame check sequence field, and is 4 octets.

A summary of field lengths for an IEEE 802.3 MAC packet are as follows:

| | |
|---|---|
| Preamble: | 7 bytes |
| SFD: | 1 byte |
| Destination Address (DA) | 6 bytes |
| Source address (SA): | 6 bytes |
| Type field: | 2 bytes |
| Data: | 0–1500 bytes |
| Pad: | 0–46 bytes |
| CRC: | 4 bytes |

Figure 6A:
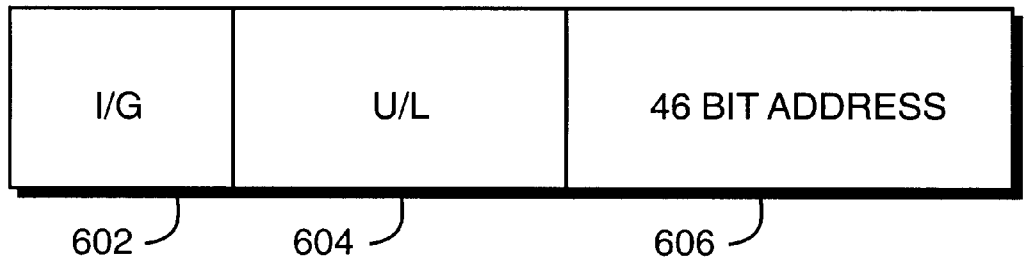
FIG. 6 is a format diagram of an IEEE 802.3 48 bit address.
Figure 6B:
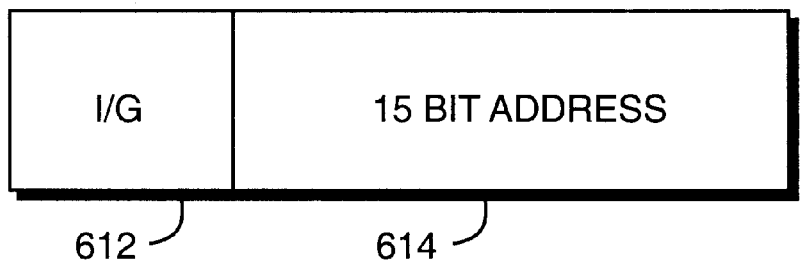

Turning now to FIG. 6, the bit format of a 48 bit (or 6 octet) address is shown. Field 602 is the I/G (individual/group) field, is one bit: and =0 for an individual address; or =1 for a group address. Field 604 is the U/L (administration field) field, is one bit, and: =0 when the address is a globally administered address; and =1 when the address is a locally administrated address. Field 606 is a 46 bit address.

Figure 7:
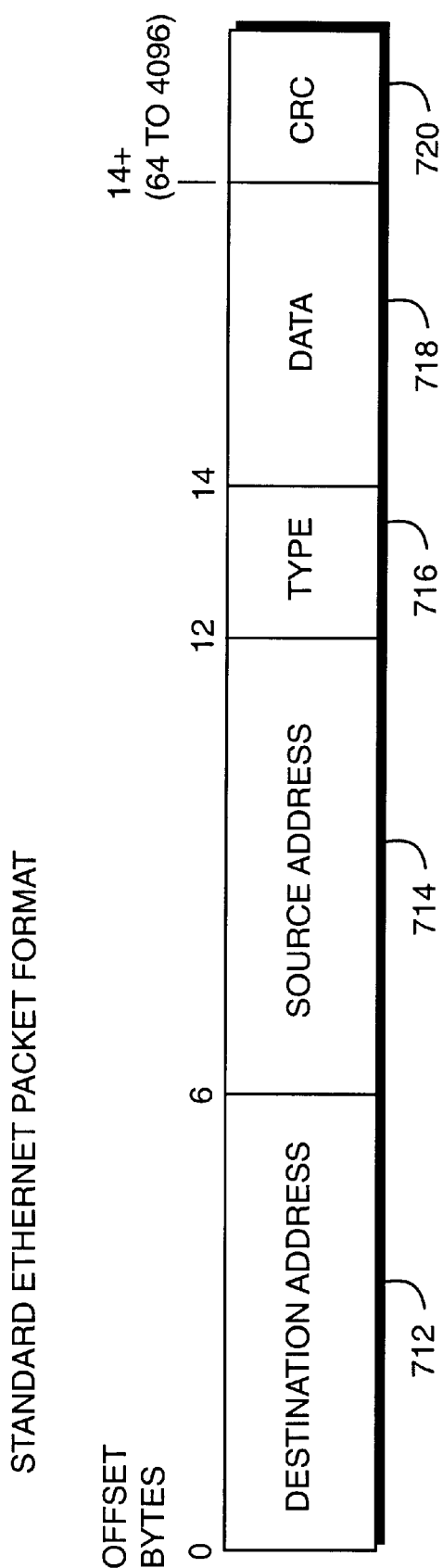
FIG. 7 is a packet format diagram for an Ethernet packet.

Turning now to FIG. 7, the format of an Ethernet packet is shown. Field 712 is a destination address. Field 714 is a source address. Field 716 is a "type" field. Field 718 is the data. Field 720 is the cyclic redundancy check, CRC field. Field lengths in bytes are given hereinabove.

Byte offset is indicated above the field boundaries. The destination address field 712 begins at offset 0. Source address field 714 begins at offset 6. Type field 716 begins at offset 12. Data field 718 begins at offset 14.

Turning now to FIG. 8, the format of a unicast IP (Internet Protocol) packet is shown. The destination address XX XX XX XX XX XX is shown in field 802, at Ethernet byte offset of 0.

Field 812 contains, at Ethernet byte offset 12, the packet type which has a 2 byte value of 08 00. Also, field 812 is the packet type field 716 of FIG. 7.

The field pattern in hex is shown in column 814. A comment describing the field is shown in column 816. The IEEE 802.3 offset is also shown in column 818, and is the Ethernet offset plus 7 bytes of preamble and one byte of "start frame delimiter" SFD, for a total of 8 bytes difference, as shown in FIG. 7.

Alternative Embodiments of the Invention

Alternatively, the packet filtering machine may have a plurality of modes of operation, where exemplary modes of operation include:

1. Perfect filtering—the machine has 16 different addresses stored in it and it checks to see if the receiving packet destination address is a match to any one of them. If it matches, the packet is received, and the computer wake-up cycle initiated. This mode is normal DA address filtering.

2. In a further exemplary embodiment of the invention, an unicast address is first filtered against the station system address, and in the event that a match occurs, the other filters are tested in order to determine if the computer wake-up cycle should be initiated. In the event that no match occurs, the packet is ignored.

3. A plurality, such as four (4) CRC16 filters, are used in a hash function filter method.

Each filter has the following:
1. 32 bits mask: each bit in this mask corresponds to one byte in the detected packet. If the bit is in '1', the corresponding byte is taken into the CRC16 calculation.
2. 8-bit offset—a "pointer" into the packet to tell from which byte to start the CRC16 computation. The pointer and the mask are used cooperatively to locate the bytes to be used in the CRC16 calculation.

In an exemplary embodiment of the invention (implemented as a preferred embodiment in the design of a specific network interface device 204 chip) the minimum value of the offset is 12, and therefore the CRC16 calculation skips the destination address (6 bytes) as it is compared in the perfect filter stage, and also skips the source address (6 bytes).

In a further exemplary embodiment of the invention, the apparatus reads a field of the received packet and increments the offset in order to accomodate the packet protocol. The packet protocol of a VLAN packet is accommodated in this way by: first reading the VLAN type in the type field at offset 12 in bytes 12–13; and, then in the event that the VLAN type is detected, incrementing the offset to the value of 16. VLAN detection is further disclosed hereinbelow.

3. a 16-bit CRC16 "selected CRC value" to compare with the results of the CRC16 calculation done on the bytes of the detected packet.
4. Selection bits may be used. For example, the selection bits, in an exemplary embodiment of the invention, may have the following values and meanings:
    4.1. Multi-unicast. If "set" (1), the filter applies to multicast frames only. If "clear" (0), the filter applies to unicast frames only.
    4.2. Inverse: if set, the matching signal is asserted only if there were not a match.
    4.3. Add-previous: If set, perform a logical AND operation between the result of the previous filter and the result of the present filter.
    4.4. Enable filter. Filter is activated only if this bit is set.
5. A "global-unicast control bit" which commands the apparatus to assert the wakeup signal if the received packet is a unicast packet (first bit of the destination address is zero), without any further pattern check.
6. VLAN support. A VLAN packet, or frame, is identical to a non__VLAN packet with the exception that a four (4) byte VLAN header is inserted between the Source Address field 714 and the Frame Type field 716. Accordingly, for a given protocol VLAN and non__ VLAN packets share the same wake-up pattern but at a different offset (4 bytes difference).

It is believed that the VLAN type designation has not been chosen by a standards body as of the date of filing this patent application. However, the type is expected to be assigned to bytes 12–13. The other two bytes of the VLAN header, bytes 14–15, will be a VLAN identifier, VID. Also, priority information will be assigned to some of the bytes 14–15 bits, as will a bit indicating fragmentation in Ethernet packets.

In order to avoid duplication of patterns stored in registers of network interface device 204, the invention includes a mechanism to share the same wake-up pattern between VLAN and non__VLAN frames. The mechanism is, a VLAN packet is identified if the type field 716 has the VLAN value, as programed into the pattern filter's command and status register. In the event that the packet is a VLAN packet, the value of the offset is automatically incremented to be at least large enough to skip the VLAN header.

For example, when the minimum offset is 12 bytes and the VLAN header is 4 bytes, then the increment is 4 bytes. The offset then becomes a total of 16 bytes. Thereby, the CRC16 hash function calculation is performed as though the 4 byte VLAN header were not there. That is, in a filter looking for a VLAN packet, the hash function calculation starts at the filter's offset+4 bytes, which is at an offset value of 16.

The offset is thereby dynamically changed. The filter checks type field 716 for the VLAN type. In the event that the VLAN type is discovered, the offset is incremented in order to skip the VLAN header. This dynamic adjustment of the offset permits accommodation of VLAN packets without duplicating the mask in another filter register.

Dynamic adjustment of the offset, dynamic adjustment of the mask, or dynamic adjustment of any other filter parameter can be done in response to information read from the detected packet. Changing the filter parameters in response to information read from a detected packet provides a mechanism to reduce storage requirements while permitting the invention to respond to a wide variety of packet protocols for the purpose of responding to the detection of a desired packet, such as waking a sleeping computer.

Mask for Imperfect Packet Filtering

An exemplary mask used for imperfect packet filtering is given below, with assumptions numbered 1–3.

1) MASK (this exemplary mask is 32 bits in length, so it therefore refers to 32 bytes of the received packet)

OF 01 00 00 (32 bits expressed in hex)
    00001111 00000001 00000000 00000000 (32 bits in binary)

2) OFFSET=12 The minimal offset is 12 bytes to skip the DA and the SA, and so in this exemplary embodiment the offset is assumed to be 12 bytes.

3) PACKET:

00 01 02 03 04 05 06 07 08 09 0A 0B 0C 0D 0E 0F 10
    11 12 13 14 15 16 17 18 19 1A 1B 1C 1D 1E 1F 20 21
    22 23 24 25 26 27 28 29 2A 2B 2C 2D 2E 2F 30 31 XX
    XX . . . CRC

The bit order within the byte of the mask goes from the least significant bit (bit 0) to the most significant bit (bit 7). Therefore, in the example the first byte of the mask is 0×0F, meaning that the unmasked bytes are:

offset +0
offset +1
offset +2
offset +3
offset +8.

For the assumed offset of 12, the unmasked bytes are: 12, 13, 14, 15, and 18, or: 0C 0D 0E 0F 14.

So looking at the mask given above, the following bytes will be entered into the CRC16 computation machine, and no other bytes from the packet: 0C 0D 0E 0F 14.

In a further exemplary embodiment of a mask, if the offset were 16 (meaning that we skip the first 16 bytes of the packet), then the bytes that will be entered into the CRC16 machine computation are: 10 11 12 13 18.

Typical wake-Up Packets

Turning now to FIG. 9, the format of an ARP Request packet, as defined in IP version 4, is shown. As shown in field 902, the destination address is at Ethernet offset 0, is the broadcast address, and the hex pattern is FF FF FF FF FF FF, which is 48 "1" bits in binary. Field 904 gives the ARP protocol type at Ethernet offset 12 as, 08 06. Field 906, at Ethernet offset 21, contains 01. Field 908, at Ethernet offset 38, contains XX XX XX XX, meaning that an IP address is requested.

Turning now to FIG. 10, the format of a "NBT Name Query/Registration for Computername" packet, as defined in IP version 4 is shown. Field 1002, at Ethernet offset 00 is the broadcast destination address, and contains: FF FF FF FF FF FF. Field 1004 at Ethernet offset 12 is the Type Field, and is: 08 00. Field 1006, at Ethernet offset 23 contains: 11. Field 1007, at Ethernet offset 34 contains: 00 89 00 89. Field 1008, at Ethernet offset 45, contains: 10. Field 1010 at Ethernet offset 54 contains 20. Field 1912 at Ethernet offset 55, contains: 32 bytes for holding the name of the computer.

Turning now to FIG. 11, the format of a Neighbor Solicitation packet, as defined in IP version 6, is shown. Field 1102 contains the destination address, the broadcast address of FF FF FF FF FF FF. Field 1104, at Ethernet offset 12, contains: 08 00, indicating that the packet is an IP type packet. Field 1106, at Ethernet offset 38, contains an IP destination address.

By way of explanation, In order to resolve IP to physical address translation, IPv6 uses the Neighbor Discovery Protocol. The Neighbor Discovery Protocol permits nodes to detect and determine each other's addresses. When a node needs to resolve the Unicast IPv6 address of a neighbor, the node sends a Neighbor Solicitation (NS) packet to the solicited-node multicast address corresponding to the target address. The solicited node multicast address is computed as a function of the solicited target's address, and is formed by taking the low order 32 bits of the target IP address and appending those bits to the 96 bit prefix:

FF02:0:0:0:0:1 to produce a multicast address. For example, the solicited node multicast address corresponding to the IP address:

"4036:0:0:0:1:800:200E:8C6C"

is

"FF02:0:0:0:0:1:200E:8C6C"

In the Neighbor Solicitation (NS) packet, the solicited node multicast address is the Destination Address in the IP header.

It is often desirable to awaken a sleeping computer when a Neighbor Solicitation (NS) packet directed to the sleeping computer is detected by the sleeping computer.

Turning now to FIG. 12, the format of an unicast IPX packet is shown. Field 1202, at Ethernet offset 00 contains the unique unicast destination address. Field 1204, at Ethernet offset 12, contains 81 37, indicating that the protocol type is IPX. Three packet types, with different values at Ethernet offset 14 are shown:

field 1206 for an Eth_SNAP packet, at Ethernet offset 14, contains: AA AA 03 00 00 00 81 37.

field 1208, for a Eth_802.3 packet, has at Ethernet offset 14 the value: FF FF, indicating that the protocol type is IPX.

field 1210, for an Eth_802.2 packet, at Ethernet offset 14 contains: E0 E0 03.

Turning now to FIG. 13, the format of a IPX Diagnostic Responder Request packet is shown. Field 1301, at Ethernet offset 00, contains the broadcast address FF FF FF FF FF FF. Different field contents are shown for different packet types:

field 1302, for an EthII packet, contains: at Ethernet offset 12: 81 37 indicating an IPX protocol type; and, at Ethernet offset 30: 04 56, indicating a IPX destination socket diagnostic request.

field 1304, for an Eth_SNAP packet, contains: at Ethernet offset 14: AA AA 03 00 00 00 81 37, indicating an IPX SAP protocol type, and at Ethernet offset 38: 04 56, indicating an IPX destination socket diagnostic request.

field 1306, for an Eth_802.3 packet, at Ethernet offset 14 contains: FF FF, and at Ethernet offset 30 contains: 04 56.

field 1308, for an Eth_802.3 packet, at Ethernet offset 14, contains: E0 E0 03; and at Ethernet offset 33 contains 04 56.

Filter Registers

Turning now to FIG. 14, there are shown eight VC Filter registers, R0 through R7, for performing imperfect filtering. Each register is a 32 bit register. In an exemplary embodiment of the invention, these eight registers implement four imperfect filters. The filters are referred to as filter #1 through filter #4. Registers R0, R1, R2, R3, R4, R5, R6, R7 are implemented in the VC Filter 220 portion of network interface device 204.

Each filter uses a byte mask. Registers 0, 1, 2, and 3 contain the byte masks, where the byte masks are of length 32 bits. Each bit of the mask selects a byte from the received packet for the CRC16 hash function calculation. Therefore, the pattern of 32 bytes is compressed by the CRC16 hash function calculation to a 16 bit value.

Register 4 contains four 1 byte commands, one command associated with each filter.

Register 5 contains four 1 byte offsets, one offset associated with each filter. The offset determines which byte of the packet that the first bit of the mask is associated with, and therefore which byte is selected if the first bit of the mask has the value "1".

Registers 6 and 7 each contain a 2 byte desired CRC value (16-bit), for a total of four desired CRC values, where each is associated with one of the filters. The desired CRC value contained in Registers 6 and 7 are compared with the CRC values computed during the imperfect filter hash function calculation, in order to determine whether or not the computer should be awakened from the low power state upon reception of the packet, as explained more fully with reference to FIG. 3 and FIG. 4.

Turning now to FIG. 15, commands controlling imperfect filtering logic are given. The commands are contained in the four 1 byte fields of Register 4 of FIG. 14. Each 1 byte field has 8 bits. Bits 07:04 are reserved, and are not used in the present exemplary embodiment of the invention.

Bit 03, the And_Previous bit, implements Boolean logic. When set, the result of the current entry is logically ANDed with the result of the previous filter. This AND logic allows a filter pattern longer than 32 bytes, by splitting the mask between two filters, three filters, or four filters, depending on how many of the filters have the And_Previous bit set. For filter #1, the And_Previous bit chains the filter with the result of the global unicast filtering of the previous stage, thereby potentially rejecting the global unicast packet for wake-up by applying additional logic in the next stage of filtering.

Bit 02, the Address_Type bit, indicates the destination type (Unicast or Broadcast) of the packet.

1: Broadcast

0: Unicast

If bit 02=1, the CRC calculation for filtering is done for only a broadcast packet.

If bit 02=0, the CRC is calculated only for a unicast packet.

The packet destination address is filtered by the adapter's Destination Address filter. A mismatch between the Address_Type bit and the Address_Type signal provided by the Destination Address filter prevents the CRC from being calculated, and therefore there is no match.

Bit 01, the Inverse Mode bit, when set, reverses the logic of the CRC 16 hash function signal, to make a match become a packet rejection. Together the Inverse Mode bit with the And_Previous mode, allows rejection of a subset of wake-up packets by creating filter logic such as "Pattern 1 AND NOT Pattern 2".

Bit 00, the Enable Filter bit, when set, enables the filter.

Turning now to FIG. 16, the Byte Mask is shown. The mask is 32 bits in length. Each bit points to a byte in the detected packet. If the bit of the mask is set to a value of "1", the corresponding byte of the packet is used in the CRC 16 hash function calculation. If the bit of the mask is "0", the corresponding byte of the packet is not used during the CRC 16 hash function calculation.

Turning now to FIG. 17, the filter byte offset is shown. The byte offset contains a value, which value is the number of bytes of offset before the byte mask is applied to the bytes of the detected packet. Offset value "0" is the first byte of the frame's destination address. Offset value "12" is the first byte of the packet's "type" field, as shown in FIG. 7.

Turning now to FIG. 18, the "Pattern's CRC" value is shown. The pattern's CRC value for a specific filter is determined, in an exemplary embodiment of the invention, by first entering the byte pattern of the packet for which it is desired to awaken a sleeping computer, where the pattern is entered into driver software which operates network interface device 204. The associated byte mask and the associated Offset are also entered into the driver software. Network interface device 204 then computes the CRC 16 hash function by using both the entered packet pattern, the entered Offset, and the entered byte mask. The result of the computation is then written into the "Pattern's CRC" value register, the field of registers R6 or R7 of FIG. 14 associated with the specific filter.

Access to Filter Registers

In an exemplary embodiment of the invention, it is convenient to use management packets to enter data into the software driver which operates network interface device 204. In an alternative embodiment, an operator at the keyboard of the particular computer enters the desired data into an interface to the driver software.

Access to the Registers used by the filters is accomplished by the driver software.

The Network Interface Device 204 has two (2) input/output (I/O) Register banks: CSR 0–15 and CSR+ 1–2. The selection of the bank is done through "CSR0<Enable_CSR+_Bank>" (bit_26).

The filter's registers are mapped in the CSR+ bank:

The Power Management Event Command/Status Register is mapped as CSR2+.

The filter's registers, Registers 0–7, are accessed sequentially through CSR1+:

Setting the CSR0<Enable_CSR+_Bank> (bit_26) automatically resets the register's pointer to Reg0. Therefore the init sequence is:

Set CSR0<Enable_CSR+_Bank>
Load Reg0_value in CSR1+
Load Reg1_value in CSR1+
Load Reg2_value in CSR1+
Load Reg3_value in CSR1+
Load Reg4_value in CSR1+
Load Reg5_value in CSR1+
Load Reg6_value in CSR1+
Load Reg7_value in CSR1+
Reset CSR0<Enable_CSR+_Bank>

The driver executes this sequence of register initialization steps whenever it is desired to enter data into the pattern filter Registers 0–7.

Packet Types for Awakening a Sleeping Computer

An exemplary list of packets, in an exemplary embodiment of the invention, for which it is desirable to awaken a computer is set forth hereinbelow. The computer is awakened from being asleep, that is from being in a low power state, when the packet is detected by the network subsystem. Included in the list are the following packet types:

Unicast IP: as shown in FIG. 8, and containing the Destination Address of the computer.

ARP Request: as shown in FIG. 9, and as defined for IP version 4.

NBT Name Query/Registration: as shown in FIG. 10, and as defined for IP version 4.

Neighbor Solicitation: as shown in FIG. 11, and as defined for IP version 6.

Unicast IPX: as shown in FIG. 12.

IPX Diagnostic Responder Request: as shown in FIG. 13.

The above packet types are merely representative of the packet types for which it is desirable to awaken a sleeping computer from a low power state to a fully powered state. As new network protocols are developed, and as new packet types are defined, it may become desirable to awaken a sleeping computer by detection of one of the new packets. Alternatively, it may become desirable to awaken a sleeping computer by detection of other currently defined packets. For example, it may be desirable to awaken a sleeping computer upon receipt of other types of packets, such as Appletalk packets, Banyan-vines packets, etc. The present invention may usefully be employed to awaken a sleeping computer by detection of many different types of packets by simply defining a mask which selects bytes useful for identifying the packet, and selecting an offset so that the mask points to the useful bytes. The expected hash function is then stored into the CRC register associated with the selected filter.

For example, the wake up filter will work for any packet protocol for which the computer operating system implementing the protocol stack makes the computer power manageable. Currently, it is known that Microsoft Windows NT 5.0 and Microsoft "Windows 98" provide power management for the IP protocol. These operating systems also provide some power management for the Novel IPX protocol. Other operating systems may provide power management in other protocol stacks in the future. The present inventive filter provides flexibility to accommodate future developments in operating system design and packet formats, by use of the mask, the And_Previous functionality, and the offset setting.

Example: Filtering for an ARP Request Packet

For example, a filter for an ARP Request packet will next be described. Imperfect filter #1 is used in this exemplary embodiment of the invention to filter for an ARP Request packet.

The protocol address of the target computer is assumed to be: 157.55.199.72 (=9d37c748 hex). The ARP Request packet has this Protocol Address in its data field, and this Protocol Address is selected by the byte mask for use in the CRC calculation of this exemplary filtering calculation. In the examples, the indication "xx" means that the filtering function under discussion does not care what data is loaded into the position xx. The ARP Request packet has the following data:

FF FF FF FF FF FF xx xx xx xx xx xx 08 06 xx xx xx xx xx xx xx 01 xx xx xx xx xx xx xx xx xx xx xx xx xx xx xx xx 9d 37 c7 48

The packet's destination address is the broadcast address FF FF FF FF FF FF because an ARP Request packet has a broadcast address. One of the destination addresses for the perfect filtering function loaded in the MAC filter is also a broadcast address.

The CRC loaded into the filter is calculated from the ARP Request packet data, starting at offset 12 within the ARP Request packet with the associated byte mask:

binary: 1100 0000 0100 0000 0000 0000 0011 hex: C080003C

CRC16(08 06 01 9d 37 48)=0263 hex.

The CRC loaded into the filter is calculated from ARP Request packet data, starting at offset 12 within the ARP Request packet:

08 06 00 00 00 00 00 00 00 01 00 00 00 00 00 00
00 00 00 00 00 00 00 00 00 00 9d 37 c7 48 with the associated byte mask:

binary: 0011 1100 0000 0000 0000 0010 0000 0011 hex: 3C000203

The same byte mask is loaded into a register of the filter for use in filtering bytes from any packet detected by the network subsystem, as described hereinbelow.

Assuming that filter #1 in the imperfect filtering function is used to filter for ARP Request packets, then:

Register R0 contains Byte mask #1(32 bits):

binary: 1100 0000 0100 0000 0000 0000 0011 1100 hex: C080003C

Register R4, in Command #1 field (8-bit) contains:

bit 07:04 reserved bit 03 "1" (And_Previous command)

bit 02 "1" (Address_Type, indicating a Broadcast type packet is being filtered for)

bit 01 "0" (Inverse mode command, value "0" indicates inverse AND logic is used with the perfect filtering function)

bit 00 "1" (Enable Filter command) the value of "1" enables filter #1.

Register R5, at Offset #1 field (8-bit): contains hex 12 to indicate a 12 byte offset.

Register R6, at CRC 16 #1 field (16-bit): contains the hash result obtained by performing a CRC 16 calculation on the byte pattern which the filter is looking for, by computing the result using the byte mask and the offset. The contents of Register R6 is the result calculated as described above for the ARP Request packet. The contents of Register R6, at CRC #1 field, is the expected value which will be produced by the CRC 16 calculation when an ARP Request packet is:

CRC16(08 06 01 9d 37 48)=0263 hex.

The contents of Register R6, at CRC #1 field is this expected value which will be produced by the CRC16 calculation when an ARP Request packet is detected by the network subsystem.

Register Contents for Exemplary Wake-Up Packets

The following tables provide contents of the registers for exemplary packets used to awaken a sleeping computer.

1. Unicast IP to Node having the address AB-00-04-01-D9-FA:

Wake Up Pattern

| Offset (bytes) | Pattern (hex) | |
|---|---|---|
| 00 | AB 00 04 01 D9 FA | Destination MAC Address (Station Addr) |
| 12 | 08 00 | Protocol Type (IP) |

Filter's Registers

| Register's Filter [n] | Value (hex) | |
|---|---|---|
| Byte Mask | 00000003 | pattern's bytes: 12, 13 |
| Offset | 0C | offset = 12 |
| Command | 01 | address_type = unicast, enable_filter |
| CRC16 | 7006 | CRC16 (08,00) |

2. Ipv4 ARP Request to Node 157.55.199.72 (0x9d37c748):

Wake Up Pattern

| Offset (bytes) | Pattern (hex) | |
|---|---|---|
| 00 | FF FF FF FF FF FF | Destination MAC Address (Broadcast) |
| 12 | 08 06 | Protocol Type (ARP) |
| 21 | 01 | ARP Opcode (Request) |
| 38 | 9d 37 c7 48 | IP Address requested |

Filter's Registers

| Register's Filter [n] | Value (hex) | |
|---|---|---|
| Byte Mask | 3C000203 | pattern's bytes: 12,13,21,38 . . . 41 |
| Offset | 0C | offset = 12 |
| Command | 09 | address_type = multicast, enable_filter |
| CRC16 | 0263 | CRC16 (08,06,01,9d,37,47,48) |

3. Ipv4 NBT Name Query/Registration for Computername <00>, <03>, <02>"DIGITAL"

Wake Up Pattern

| Offset (bytes) | Pattern (hex) | |
|---|---|---|
| 00 | FF FF FF FF FF FF | Destination MAC Address (Broadcast) |
| 12 | 08 00 | Protocol Type (IP) |
| 23 | 11 | Protocol (UDP) |
| 34 | 00 89 00 89 | Port Number (NETBIOS Name Service) |
| 45 | 10 | NetBIOS Flags (Query OR Registration) |
| 54 | 20 | Name scope - NULL |
| 55 | 45 45 45 50 45 48 45 50 46 45 45 42 45 4D 43 41 43 41 43 41 43 41 43 41 43 41 43 41 43 41 | Computername: 30_bytes field coding in half-ASCII the name of the computer. |

Filter's Registers

1. Full Pattern

| Register's Filter [n] | Value (hex) | |
|---|---|---|
| Byte Mask | 03C00803 | pattern's bytes: 12, 13, 23, 34, . . . 37 |
| Offset | 0C | Offset = 12 |
| Command | 09 | address_type = multicast, enable_filter |
| CRC16 | 8F7E | CRC16 (08,00,11,00,89,00,89) |
| Register's Filter [n+1] | Value (hex) | |
| Byte Mask | 7FFFFFFF | pattern's bytes: 54 . . . 84 |
| Offset | 36 | Offset = 54 |
| Command | 0D | and_previous, address_type = multicast, enable_filter |
| CRC16 | BC5F | CRC16 (00,46,48 . . . 43,41) |

An exemplary translation of Command Bits into a hex representation follows. Note that the Command Field has the contents 0D hex. Reference to FIG. 15 shows that bit 3 is set to specify multicast address. Bit 2 is set in order to activate the And_Previous logic. Bit 0 is set to enable the filter. Translation of these "set" bits to hex is as follows:

bit 7 6 5 4 3 2 1 0

0 0 0 0 1 1 0 1=0D hex

Bits 7, 6, 5, and 4 are reserved for future assignment.

2. Simplified pattern (Computername field only)

| Register's Filter [n] | Value (hex) | |
|---|---|---|
| Byte Mask | 7FFFFFFF | pattern's bytes: 54 . . . 84 |
| Offset | 36 | Offset = 54 |
| Command | 09 | address_type = multicast, enable_filter |
| CRC16 | BC5F | CRC16 (00, 46, 48 . . . 43, 41) |

4. IPv6 Neighbor Solicitation to Node 4037.0.0.0.1.800.200E.8C6C

Wake Up Pattern

| Offset (bytes) | Pattern (hex) | |
|---|---|---|
| 00 | FF FF FF FF FF FF | Destination MAC Address (Broadcast) |
| 12 | 08 00 | Protocol Type (IP) |
| 38 | FF 02 00 00 00 00 00 00 00 00 00 01 20 0E 8C 6C | IP Destination Address (Target's solicited-node multicast address) |

Filter's Registers:

| Register's Filter [n] | Value (hex) | |
|---|---|---|
| Byte Mask | 0000FFFF | pattern's bytes: 38 . . . 53 |
| Offset | 26 | Offset = 38 |
| Command | 09 | address_type = multicast, enable_filter |
| CRC16 | 6F0E | CRC16 (FF,02 . . . 8C,6C) |

5. Unicast Eth_802.2 IPX to node AB-00-04-01-D9-FA Wake Up Pattern

| Offset (bytes) | Pattern (hex) | |
|---|---|---|
| 00 | AB 00 04 01 D9 FA | Destination MAC Address (Station Addr) |
| 14 | E0 E0 03 | SAP + Control (IPX) |

Filter's Registers:

| Register's Filter [n] | Value (hex) | |
|---|---|---|
| Byte Mask | 00000007 | pattern's bytes: 14 . . . 16 |
| Offset | 0E | Offset = 14 |
| Command | 01 | address_type = unicast, enable_filter |
| CRC16 | F779 | CRC16 (E0, E0, 03) |

6. Eth_802-2 IPX Diagnostic Responder Request Wake Up Pattern

| Offset (bytes) | Pattern (hex) | |
|---|---|---|
| 00 | FF FF FF FF FF FF | Destination MAC Address (Broadcast) |
| 14 | E0 E0 03 | SAP + Control (IPX) |
| 33 | 04 56 | IPX Destination Socket (Diagnostic Request) |

Filter's Registers:

| Register's Filter [n] | Value (hex) | |
|---|---|---|
| Byte Mask | 00180007 | pattern's bytes: 14 . . . 16,33,34 |
| Offset | 0E | Offset = 14 |
| Command | 09 | address_type = multicast, enable_filter |
| CRC16 | E8E0 | CRC16 (E0,E0,03,04,56) |

It is to be understood that the above described embodiments are simply illustrative of the principles of the invention. Various other modifications and changes may be made by those skilled in the art which will embody the principles of the invention and fall within the spirit and scope thereof.

What is claimed is:

1. An interface suitable for connecting a computer to a network, the computer having a high-power operational state and a low-power operational state, said interface comprising:

filtering means for selectively passing a data packet sent by the network, said filtering means comprising,
        at least one hash value;
        at least one offset value;
        at least one mask corresponding to said at least one offset value;
        means for selecting a portion of said data packet, said selected data packet portion specified by said at least one offset value and said at least one mask;
        means for deriving a hash function from said selected data packet portion;
        means for comparing said derived hash function with said at least one hash value; and
    switching means responsive to said filtering means, for initiating a transition of the computer between the low-power state and the high-power state if said derived hash function matches said at least one hash value.

2. The interface of claim 1 further comprising means for performing an adjustment of said at least one offset value.

3. The interface of claim 2 wherein said means for performing an adjustment is responsive to the format of said data packet.

4. The interface of claim 1 wherein said data packet comprises a plurality of bytes and said means for selecting a portion of said data packet functions by using said at least one offset value to define a first said byte for inclusion in said selected data packet portion.

5. The interface of claim 4 wherein said means for selecting a portion of said data packet further functions by using said at least one mask to define at least one portion of said bytes for inclusion in said selected data packet portion.

6. The interface of claim 1 further comprising means for loading said at least one hash value into a register.

7. The interface of claim 1 further comprising at least one command associated with said at least one mask.

8. The interface of claim 7 wherein said at least one command functions to combine said at least one mask with at least one other said mask.

9. The interface of claim 7 wherein said at least one command functions to indicate the destination type of said data packet.

10. The interface of claim 9 wherein said data packet destination type comprises a member of the group consisting of a broadcast packet and a unicast packet.

11. The interface of claim 7 wherein said at least one command functions to reverse the logic of said at least one hash value.

12. The interface of claim 7 wherein said at least one command functions to enable said at least one mask.

13. The interface of claim 1 wherein said means for deriving a hash function comprises means for performing a 32-bit cyclic redundancy check computation.

14. The interface of claim 1 wherein said means for deriving a hash function comprises means for performing a 16-bit cyclic redundancy check computation.

15. The interface of claim 7 wherein said switching means comprises means for initiating a boot up power cycle for the computer.

16. An method for interfacing a computer with a network, the computer having a high-power operational state and a low-power operational state, said method comprising the steps of:

obtaining a hash value;

obtaining an offset value;

obtaining a mask corresponding to said offset value;

detecting a data packet sent by the network, said data packet comprising a plurality of bytes;

filtering said data packet by means of said mask and said offset value to yield a portion of the data packet;

deriving a hash function from said data packet portion;

comparing said derived hash function with said hash value; and if said derived hash function matches said hash value, initiating a transition of the computer between the low-power state and the high-power state.

17. The method of claim 16 further comprising the step of adjusting said offset value in response to the format of the data packet prior to said step of filtering said data packet.

18. The method of claim 16 wherein said step of filtering said data packet comprises the step of using said offset value to define a first byte for inclusion in said data packet portion.

19. The method of claim 18 wherein said step of filtering said data packet further comprises the step of using said mask to define a portion of said bytes for inclusion in said data packet portion.

20. The method of claim 18 further comprising the steps of:

obtaining a command associated with said mask; and modifying said mask in accordance with said command prior to said step of filtering said data packet.

21. The method of claim 20 wherein said step of modifying said mask in accordance with said command comprises the steps of:

obtaining a second mask; and combining said mask with said second mask prior to said step of filtering said data packet.

22. The method of claim 16 further comprising the step of determining the destination type of data packet to be either a broadcast packet or a unicast packet.

23. The method of claim 16 further comprising the step of reversing the logic of said hash value subsequent to said step of obtaining a hash value.

24. The method of claim 16 wherein said step of deriving a hash function comprises the step of performing a 16-bit cyclic redundancy check computation.

25. The method of claim 16 wherein said stop of deriving a hash function comprises the step of performing a 32-bit cyclic redundancy check computation.

26. The method of claim 16 wherein said step of initiating a transition of the computer comprises the step of initiating a boot up power cycle for the computer.

* * * * *